United States Patent

Brenner et al.

[11] Patent Number: 4,697,794
[45] Date of Patent: Oct. 6, 1987

[54] RUBBER MOUNTING WITH HYDRAULIC DAMPING

[75] Inventors: Heinz Brenner, Bad Neuenahr-Ahrweiler; Heinrich Meyer, Konigswinter; Kurt Schmidt, Bad Neuenahr-Ahrweiler, all of Fed. Rep. of Germany

[73] Assignee: BOGE GmbH, Eitorf, Fed. Rep. of Germany

[21] Appl. No.: 851,879

[22] Filed: Apr. 11, 1986

Related U.S. Application Data

[63] Continuation of Ser. No. 562,232, Dec. 16, 1983, abandoned.

[30] Foreign Application Priority Data

Dec. 16, 1982 [DE] Fed. Rep. of Germany ....... 3246587

[51] Int. Cl.$^4$ .................... B60G 15/04; F16F 13/00; B60K 5/12; F16M 13/00
[52] U.S. Cl. ................................ 267/195; 248/562; 267/140.1
[58] Field of Search ............ 267/8 R, 35, 63 R, 140.1, 267/140.4, 141, 141.2, 141.4, 153, 136; 180/300; 188/268, 298; 248/559, 562, 636, 638

[56] References Cited

U.S. PATENT DOCUMENTS

| | | | |
|---|---|---|---|
| 2,984,476 | 5/1961 | Turner | 267/35 |
| 4,159,091 | 6/1979 | Le Salver et al. | 267/140.1 |
| 4,161,304 | 7/1979 | Brenner et al. | 267/35 X |
| 4,215,842 | 8/1980 | Brenner et al. | 248/562 |
| 4,277,056 | 7/1981 | Ticks | 267/140.1 |
| 4,288,063 | 9/1981 | Brenner et al. | 267/8 R |
| 4,428,569 | 1/1984 | Takei | 267/140.1 |

FOREIGN PATENT DOCUMENTS

| | | | |
|---|---|---|---|
| 0027751 | 4/1981 | European Pat. Off. | 267/35 |
| 0012638 | 3/1982 | European Pat. Off. | |
| 0040290 | 2/1984 | European Pat. Off. | |
| 2727244 | 1/1978 | Fed. Rep. of Germany | 267/35 |
| 2833776 | 1/1980 | Fed. Rep. of Germany | |
| 3019337 | 11/1981 | Fed. Rep. of Germany | |
| 3024092 | 1/1982 | Fed. Rep. of Germany | |
| 3140783 | 4/1983 | Fed. Rep. of Germany | 267/35 |
| 2041485 | 9/1980 | United Kingdom | 267/140.1 |

Primary Examiner—Andres Kashnikow
Assistant Examiner—R. Oberleitner
Attorney, Agent, or Firm—Nils H. Ljungman

[57] ABSTRACT

A resilient mounting, such as a rubber mounting, with hydraulic damping, in particular for mounting engines of motor vehicles, has two rigid end walls which are disposed opposite to each other in the axial direction, and at least two chambers which are disposed axially one behind the other and which contain damping fluid. The chambers are separated by a rigid partitioning wall. The chambers communicate with each other through a flow passage which extends in an annular configuration around the axis of the mounting, the flow passage being formed in the rigid partitioning wall. The rigid partitioning wall is arranged radially inwardly of, and supported by, an elastic, axially movable diaphragm which is fixedly and sealingly clamped at its outer periphery. At least one of the chambers is defined in part by a rubber-elastic spring member constituting part of the generally peripheral wall of the chamber. Travel-limiting surfaces may be provided at the periphery of the rigid partitioning wall, outboard of its connection to the diaphragm, so as to control movement of the rigid partitioning wall.

20 Claims, 4 Drawing Figures

RUBBER MOUNTING WITH HYDRAULIC DAMPING

This is a continuation, under 37 CFR 1.62, from Ser. No. 562,232, filed Dec. 16, 1983, now abandoned.

FIELD OF THE INVENTION

This invention relates to a resilient mounting, typically a rubber mounting, with hydraulic damping, in particular an engine mounting for motor vehicles, the mounting being of the type having two rigid end walls which are disposed opposite to each other in the axial direction, and at least two chambers which are arranged axially one behind the other and which contain damping fluid, and of which at least one has a generally peripheral wall which is formed as a rubber-elastic spring element, and wherein the chambers communicate with each other by means of a flow passage which extends in an annular configuration around the central axis of the mounting in a substantially radial plane and which is provided in a rigid partitioning wall separating the two chambers, the inlet and outlet openings of the flow passsage being disposed on respective sides of the partitioning wall.

BACKGROUND

Rubber mountings of this general kind are used for mounting drive units in vehicles of all types. In the mounting of internal combustion engines in motor vehicles, a number of considerations are applicable. Thus, on the one hand, in order to avoid the transmission of noise it is desirable to provide the softest possible mounting with a low level of natural damping, which however, allows the movements of the engine, which are generated by, for instance, travel over the road surface, to become very great and almost go into a condition of undamped oscillation. On the other hand, substantial movements of the engine can be reduced by using hard engine mountings or separate vibration dampers, which, however, in turn results in a considerable amount of noise being transmitted to the vehicle body.

Rubber mountings generally of the above described kind are known (for example, published European patent application No. 27,751), which suffer from the disadvantage that the mounting has inadequate damping or damping over a narrow band, and inadequate dynamic decoupling of the small vibrations or oscillations of the engine. The decoupling surface, which is small in comparison with the outside diameter, provides an inadequate dynamic spring rate with which severe increases or overloads occur while still within the range which is important from the point of view of noise transmission. It is therefore not possible to achieve optimum insulation in respect of the transmission of noise from the engine to the body, in the range of about 20 to 200 Hz.

Also known are engine mountings (for example, European published application No. 12,638) in which the chambers are arranged concentrically with respect to each other and which generally have a good damping action in the low-frequency range. The disadvantage there, however, is that dynamic hardening of this known engine mounting occurs at higher frequencies of oscillation. The engine mounting therefore scarcely has any capability of insulation in respect of the high-frequency noise vibrations which are thus disadvantageously transmitted from the engine to the vehicle body.

Taking the above described art as its starting point, an object of the present invention is to provide a simple and effective rubber mounting which not only keeps low and provides adequate damping in respect of the engine vibrations which are stimulated by travel over the road surface and which originate from the engine when starting up and stopping, in the natural frequency range of the engine, while avoiding shock or impact noises when the damping action occurs, but which also provides for optimum insulation in respect of the transmission of noise from the engine to the body in the range of from about 20 to 200 Hz, wherein a linear dynamic spring rate is to be provided in that frequency range.

To achieve the foregoing object, the present invention provides that the rigid partitioning wall which has the flow passage is arranged radially inwardly of an elastic, axially movable diaphragm which is fixedly and sealingly clamped at its outer periphery.

It is advantageous for the partitioning wall to be held by the axially movable diaphragm so that it is possible in a particularly simple manner to provide for decoupling of the high-frequency, low-amplitude noise vibration. In addition, one of the two chambers serves in the operating range as an elastically deformable compensating chamber which increases in volume in an almost pressureless mode, wherein the peripheral wall of the chamber which is formed as the compensating chamber is not in the form of a rubber-elastic spring element, like the other chamber, but is in the form of a concertina-type means. The partitioning wall in conjunction with the diaphragm acts as a decoupling diaphragm which is combined with the annular flow passage that provides a particularly good damping action, so that an important advantage is to be considered as being the fact that a combination of a high damping action in the desired low-frequency and large-amplitude range and good noise insulation at high oscillation frequencies and low amplitudes is achieved, with particularly simple means. The decoupling surface area of the rigid partitioning wall, which is large in relation to the outside diameter of the mounting, ensures a linear dynamic spring rate at a low level.

Another advantageous feature provides that the outside periphery of the partitioning wall at least partially overlaps the diaphragm on its underside and/or its top side and that, starting from the clamping location radially inwardly of the overlapping peripheral portions of the partitioning wall, the spacing of the travel limiting surface or surfaces from the diaphragm increases in a radially outward direction. The travel limiting surfaces are, of course, provided by the overlapping portions of the partitioning wall radially outwardly of the clamping location. An advantage with that embodiment is that the travel limiting surfaces which gradually move apart from each other ensure, both in regard to the diaphragm for suspending the decoupling means and also in regard to the central rigid partitioning wall, that, when the damping action occurs at large amplitudes, shock or impact noises are avoided. Depending on the particular characteristics desired for a particular application, the travel limiting surface may be of a curved configuration, or a configuration which is made up of a curve and a straight line, or a straight-line configuration.

In accordance with another advantageous embodiment of the invention, the partitioning wall has projections which are uniformly distributed over its periphery. By virtue of the provision of such projections, interruptions are provided at the outside contour of the partitioning wall, and, possibly in conjunction with a grooved structure on the corresponding surface of the diaphragm, the arrangement provides that the curve of the dynamic spring rate, in relation to frequency, is corrected, for this arrangement avoids harmful liquid displacement and liquid suction effects.

An advantageous embodiment provides that the dimensions of the annular flow passage are selected in accordance with the following relationship: $L/\sqrt{F} \leq 20$, wherein L denotes the length of the flow passage and F denotes the cross-sectional area thereof.

In accordance with a particularly advantageous embodiment of the invention, the outer periphery of the diaphragm, or the outer periphery of a member secured to the diaphragm, is clamped in the connecting flange of the chambers. The diaphragm is advantageously sealingly connected at its outer periphery to a rigid clamping ring which is fixedly clamped at the connecting flange, the diaphragm engaging around the clamping ring at both faces thereof, forming axial beads. This arrangement, being of a simple design configuration, provides an advantageous configuration in respect of the axially movable partitioning wall which contains the annular flow passage. It will be appreciated that, in that arrangement, the rigid partitioning wall and the diaphragm are matched to each other in such a way as to provide for optimum decoupling of the high-frequency, low-amplitude noise vibrations.

In accordance with a particularly advantageous embodiment of the invention, the rigid partitioning wall is radially divided at its center, and, for sealingly receiving the diaphragm, the travel limiting surfaces have an internal enlargement for form-lockingly or positively receiving the diaphragm at the clamping location. The diaphragm may be provided with a reinforcing ring in the region of the clamping location.

BRIEF DESCRIPTION OF THE DRAWINGS

A preferred embodiment of the invention is described in greater detail with reference to the appended drawings, in which.

DESCRIPTION OF PREFERRED EMBODIMENTS

Figure 1:
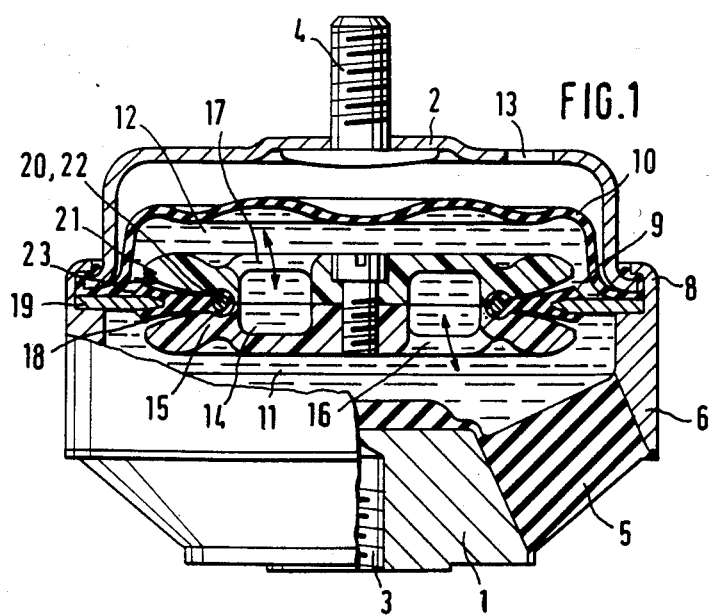
FIG. 1 is a view in axial longitudinal section of an engine mounting.
Figure 2:
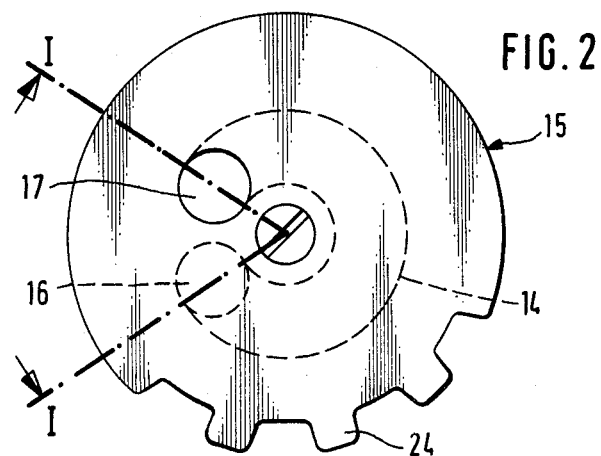
FIG. 2 is a plan view of the rigid partitioning wall of the engine mounting shown in FIG. 1, showing the locations of the inlets and outlets for the annular flow passage shown in FIG. 1.

Referring to FIGS. 1 and 2, the engine mounting shown therein has two end walls 1 and 2 which are disposed opposite to each other in the axial direction. The end walls are shown in keeping with a preferred embodiment, but it will be understood that the end walls, constituting basically mounting surfaces, may be of other configurations and relative locations and orientations in keeping with known constructions. The end wall 1 is provided either with a screw-threaded bore 3 or a screw-threaded pin (not shown), for the purposes of securing it. Correspondingly, the end wall 2 which is in the form of a cover or top plate carries a securing pin 4.

The peripheral surface of end wall 1 is of a conical or tapered configuration, and vulcanized thereto is a peripheral wall which is in the form of a rubber-elastic spring element 5 and which is joined to a connecting flange 6 at the connecting surface of the peripheral wall 5 which is remote from the end wall 1. The connecting flange 6 also includes a flange rim portion 8 which accommodates a clamping ring 19 secured to a diaphragm 18, a concertina-type member 10, and the end wall 2 which is in the form of a cover plate.

The engine mounting therefore has two chambers 11 and 12 which contain damping fluid and which are separated from each other by the diaphragm 18 and the partitioning wall 15. The chamber 11 is in the form of a pressure chamber, and the chamber 12 is in the form of a compensating chamber increasing in volume in a substantially pressure-less mode. A vent opening 13 is provided in the end wall 2.

Diaphragm 18 is of such a configuration that, in conjunction with the rigid partitioning wall 15, it can perform axial movements during operation of the mounting. The easy axial movements that the diaphragm 18 can perform correspond to the relatively small amplitudes of the high-frequency noise vibrations or oscillations which, inter alia, act on the mounting. Such vibrations are therefore decoupled by the mounting, so as to provide good noise insulation.

The rigid partitioning wall 15 includes a throughflow passage 14 which extends in a radial plane in an annular configuration around the central axis of the mounting and which forms a communication between the two chambers 11 and 12. The annular flow passage 14 is of such a length and cross-sectional area that the resonance frequency of the mass of fluid which is displaced in the annular flow passage 14 during damping operation of the mounting, in conjunction with the elasticity of the rubber-elastic spring element 5 and that of the flexible diaphragm 18, substantially corresponds to the resonance frequency of the vehicle engine on its suspension means.

The diaphragm 18, which is fixed at its outer periphery, is connected to the rigid partitioning wall 15 at its clamping location 20. Disposed in the rigid partitioning wall is the annular flow passage 14, with the inlet and outlet openings 16 and 17 thereof each opening at a respective face of the partitioning wall. The outer periphery of the diaphragm 18 is sealingly connected to a clamping ring 19 which in turn is clamped between the chambers 11 and 12.

At the connection between diaphragm 18 and clamping ring 19, the diaphragm engages around the two faces of the clamping ring 19, forming axial beads or projections 9. On the other hand, at its outer edge, and on both sides, the rigid partitioning wall 15 has travel limiting surfaces 23 opposite the beads 9 of the diaphragm 18. That arrangement provides for resiliently restricting the axial movements that can be performed by the partitioning wall 15. The contour of the diaphragm, in conjunction with the travel limiting surfaces 23, provides a gentle transition between the decoupling and the damping ranges, avoiding impact or shock noises when the damping action begins.

The partitioning wall 15 is centrally divided radially, and at its periphery, at the clamping location 20, has an internal enlargement for form-lockingly or positively receiving the diaphragm 18. Depending on the particular requirements concerned, the diaphragm 18 may be provided with an internal rigid reinforcing ring 22 in the region of the clamping location 20.

Referring to FIG. 2, the partitioning wall 15 is shown therein, in the form of an individual component. The annular flow passage 14 is formed with its openings 16 and 17 which each open at a respective side of the partitioning wall. The outer edge of the partitioning wall 15 is provided with projections 24 in the form of square or rectangular or triangular portions, as previously described.

FIG. 2 also shows a series of projections 24 which are uniformly distributed about the periphery of the partitioning wall 15. For simplicity, only two of these projections 24 are shown.

Figure 3:
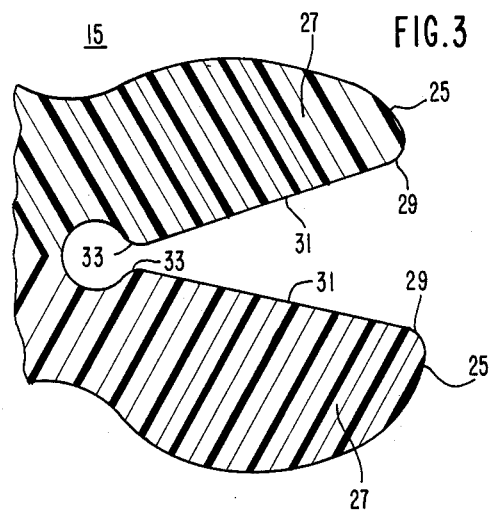
FIG. 3 shows a detail of a portion of the mounting of FIG. 1.

Referring to FIG. 3, the partitioning wall 15 has a curved portion 25 at each of two prongs 27 radiating radially outwardly and radially from a center portion of the partitioning wall 15. The inner facing surfaces of these prongs 27 have round portions 29 at the outer extremity of the prongs 27, and have straight inner surfaces 31 inwardly from the prongs. These straight inner surfaces 31 face one another on the inward portion of the prongs 27. These straight inner surfaces 31 radiate inwardly and connect with a curved portion 33, which curved portions are substantially closer to one another than the straight inner surfaces 31. FIG. 1 also shows the curved portions 33 and the straight inner surfaces 31 of the partitioning wall 15, but not in as great a detail as in FIG. 3.

Figure 4:
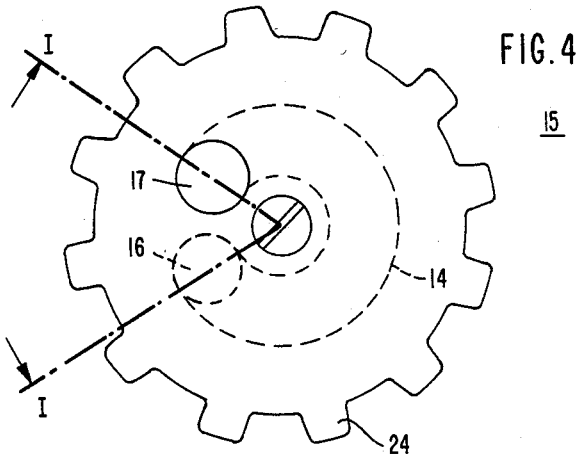
FIG. 4 shows a detail of FIG. 2.

FIG. 4 shows the projections 24 uniformly distributed about the periphery of the partitioning wall 15.

Having thus described embodiments of our invention, we claim:

1. In a rubber engine mounting for motor vehicles with hydraulic damping, said engine mounting having two rigid end walls which are disposed opposite to each other in the axial direction, and two fluid chambers which are arranged axially one adjacent to the other and which contain damping fluid, and of which at least one chamber has a peripheral wall which is formed as a rubber-elastic spring element such that the two end walls are resiliently connected, wherein the chambers communicate with each other by means of a flow passage which extends in an annular configuration around the central axis of the mounting in a substantially radial plane, the flow passage being provided in a movable, rigid partitioning wall separating the chambers, with inlet and outlet openings of the flow passage being disposed on respective sides of the rigid partitioning wall, the rigid partitioning wall which has the flow passage being arranged radially inwardly of, and supported by, an elastic, axially movable diaphragm which is fixedly and sealingly clamped at its outer periphery, said flow passage being substantially entirely enclosed within, and movable with, said movable rigid partitioning wall, said rigid partitioning wall in said elastic, axially movable diaphragm, in combination with said diaphragm, providing a damping characteristic which damps and decouples high frequency vibrations and noise generated in use the running of the engine in a range of about 20 Hertz to about 200 Hertz; and said flow passage having a length and a cross section area for damping and decoupling low frequency vibrations, produced by at least engine start-up and shut down, being transmitted in use between one of said two rigid end walls and the other, said low frequency vibrations being lower than the high frequency vibrations in said range of about 20 Hertz to about 200 Hertz generated by the running of the engine, whereby transmission of said engine vibrations from the engine, both by vibrations from the running engine and vibrations produced by the road and the turning on and off of the engine, to the body of the motor vehicle is minimized.

2. A rubber mounting as claimed in claim 1 wherein the partitioning wall is connected to the diaphragm inwardly of the outer periphery of the partitioning wall such that the outer periphery of the partitioning wall at least partially overlaps the diaphragm on at least one of the sides of the diaphragm, the overlapping portion of the partitioning wall forming a travel limiting surface for cooperation with the adjacent side of the diaphragm, the spacing of the travel limiting surface with respect to the diaphragm increasing in a radially outward direction starting generally from the clamping location of the partitioning wall to the diaphragm.

3. A rubber mounting as claimed in claim 2 wherein the travel limiting surface is of a configuration selected from the group consisting of a curve, a curve and a straight line, and a straight line, in keeping with desired characteristics of movement of the rigid partitioning wall.

4. A rubber mounting as claimed in claim 1 wherein the partitioning wall has projections uniformly distributed about its periphery.

5. A rubber mounting as claimed in claim 1 wherein the dimensions of the annular flow passage are selected to fulfill the following relationship: $L\sqrt{F} \leq 20$, wherein L denotes the length of the flow passage and F denotes the cross-sectional area of the flow passage.

6. A rubber mounting as claimed in claim 1 wherein the outer periphery of the diaphragm is connected with a rigid part of the mounting.

7. A rubber mounting as claimed in claim 1 wherein the diaphragm is sealingly connected by its outer periphery to a rigid clamping ring which is fixedly supported by a rigid part of the mounting, said diaphragm engaging around the inner periphery of the clamping ring at both surfaces thereof, and forming axial beads standing erect from both surfaces.

8. In a rubber engine mounting for rotor vehicles with hydraulic damping, said engine mounting having two rigid end walls which are disposed opposite to each other in the axial direction, and two fluid chambers which are arranged axially one adjacent to the other and which contain damping fluid, and of which at least one chamber has a peripheral wall which is formed as a rubber-elastic spring element such that the two end walls are resiliently connected, wherein the chambers communicate with each other by means of a flow passage which extends in an annular configuration around the central axis of the mounting in a substantially radial plane, the flow passage being provided in a movable, rigid partitioning wall separating the chambers, with inlet and outlet openings of the flow passage being disposed on respective sides of the rigid partitioning wall, the rigid partitioning wall which has the flow passage being arranged radially inwardly of, and supported by, and elastic, axially movable diaphragm which is fixedly and sealingly clamped at its outer periphery, said rigid partitioning wall in said elastic, axially movable diaphragm having, in combination with said diaphragm, providing a damping characteristic which damps and decouples high frequency vibrations and noise generated in use by the running of the engine and said flow passage being for damping and decoupling low frequencies, produced by at least engine start-up and shut down, being transmitted in use between one of said two rigid end walls and the other, said low frequency vibrations being lower than the high frequency vibrations generated by the running of the engine, whereby transmission of said engine vibrations from the engine to the body of the motor vehicle is minimized, wherein the partitioning wall is connected to the diaphragm inwardly of the outer periphery of the partitioning wall such that the outer periphery of the partitioning wall at least partially overlaps the diaphragm on at least one of the sides of the diaphragm, the overlapping portion of the partitioning wall forming a travel limiting surface for cooperation with the adjacent side of the diaphragm, the spacing of the travel limiting surface with respect to the diaphragm increasing in a radially outward direction.

9. A rubber mounting as claimed in claim 8 wherein said spacing of the travel limiting surface, with respect to the diaphragm increases in a radially outward outward direction, starts generally from the clamping location of the partitioning wall to the diaphragm.

10. A rubber mounting as claimed in claim 9 wherein the travel limiting surface is of a configuration selected from the group consisting of a curve, a curve and a straight line, and a straight line, in keeping with desired characteristics of movement of the rigid partitioning wall.

11. A rubber mounting as claimed in claim 10 wherein the partitioning wall has projections uniformly distributed about its periphery.

12. A rubber mounting as claimed in claim 11 wherein the dimensions of the annular flow passage are selected to fulfill the following relationship: $L\sqrt{F} \leq 20$, wherein L denotes the length of the flow passage and F denotes the cross-sectional area of the flow passage.

13. A rubber mounting as claimed in claim 12 wherein the outer periphery of the diaphragm is connected with a rigid part of the mounting.

14. A rubber mounting as claimed in claim 12 wherein the diaphragm is sealingly connected by its outer periphery to a rigid clamping ring which is fixedly supported by a rigid part of the mounting, said diaphragm engaging around the inner periphery of the clamping ring at both surfaces thereof, and forming axial beads standing proud from both surface.

15. A rubber mounting as claimed in claim 8 wherein the travel limiting surface is of a configuration selected from the group consisting of a curve, a curve and a straight line, and a straight line, in keeping with desired characteristics of movement of the rigid partitioning wall.

16. A rubber mounting as claimed in claim 8 wherein the partitioning wall has projections uniformly distributed about its periphery.

17. A rubber mounting as claimed in claim 8 wherein the dimensions of the annular flow passage are selected to fulfill the following relationship: $L\sqrt{F} \leq 20$, wherein L denotes the length of the flow passage and F denotes the cross-sectional area of the flow passage.

18. A rubber mounting as claimed in claim 8 wherein the outer periphery of the diaphragm is connected with a rigid part of the mounting.

19. A rubber mounting as claimed in claim 8 wherein the diaphragm is sealingly connected by its outer periphery to a rigid clamping ring which is fixedly supported by a rigid part of the mounting, said diaphragm engaging around the inner periphery of the clamping ring at both surfaces thereof, and forming axial beads standing proud from both surfaces.

20. In a rubber engine mounting for motor vehicles with hydraulic damping, said engine mounting having two rigid end walls which are disposed opposite to each other in the axial direction, and two fluid chambers which are arranged axially one adjacent to the other and which contain damping fluid, and of which at least one chamber has a peripheral wall which is formed as a rubber-elastic spring element such that the two end walls are resiliently connected, wherein the chambers communicate with each other by means of a flow passage which extends in an annular configuration around the central axis of the mounting in a substantially radial plane, the flow passage being provided in a movable, rigid partitioning wall separating the chamber, with inlet and outlet openings of the flow passage being disposed on respective sides of the rigid partitioning wall, the rigid partitioning wall which has the flow passage being arranged radially inwardly of, and supported by, and elastic, axially movable diaphragm which is fixedly and sealingly clamped at its outer periphery, said flow passage being substantially entirely enclosed within, and movable with, said movable rigid partitioning wall, said rigid partitioning wall in said elastic, axially movable diaphragm, in combination with said diaphragm, providing a damping characteristic which damps and decouples high frequency vibrations and noise generated in use by the running of the engine; and said flow passage having a length and a cross section area for damping and decoupling low frequency vibrations, produced by at least engine start-up and shut down, being transmitted in use between one of said two rigid end walls and the other, said low frequency vibrations being lower than the high frequency vibrations generated by the running of the engine, whereby transmission of said engine vibrations from the engine, both by vibrations produced by the running engine and vibrations produced by road action and the turning on and off of the engine, to the body of the motor vehicle is minimized.

* * * * *